Oct. 30, 1934.      S. B. CLARK ET AL      1,979,141
PIPE JOINT AND PIPE JOINT GASKET
Filed July 1, 1932
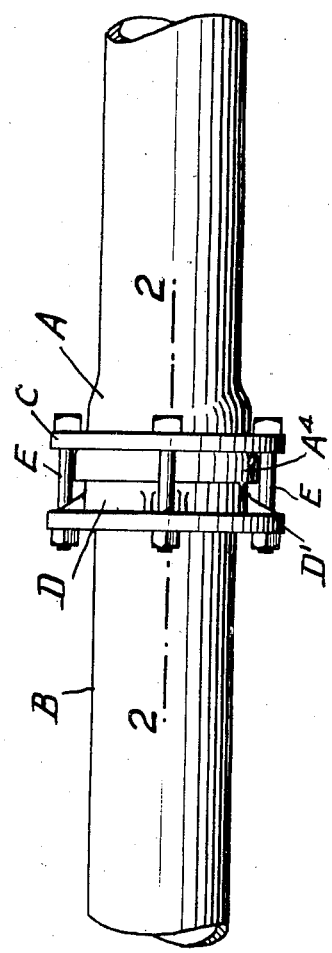
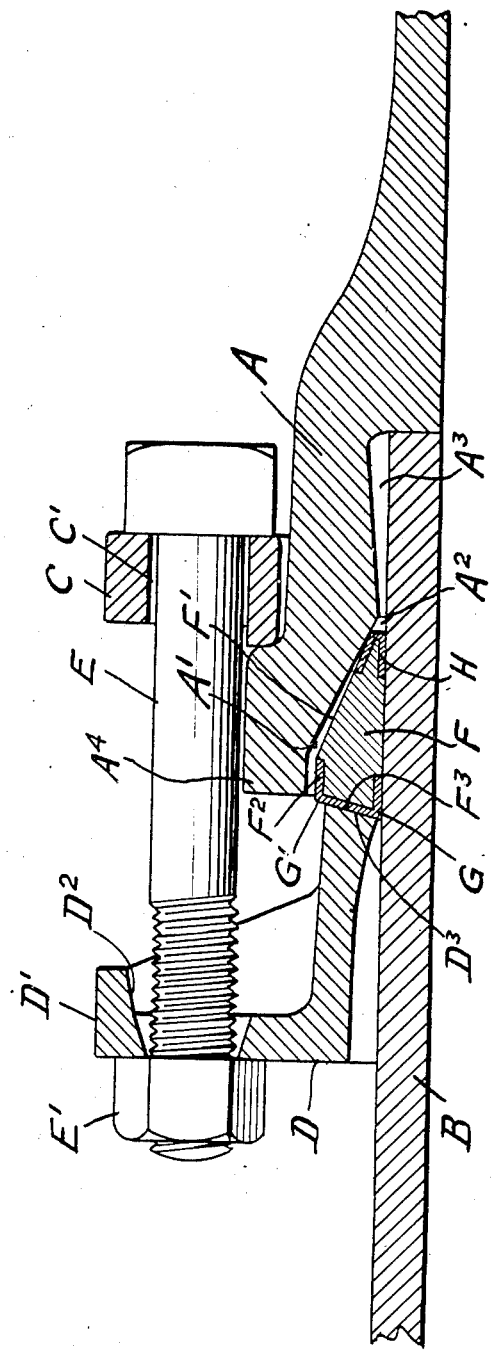
INVENTORS
Stuart B. Clark
and
Frederick C. Langenberg
BY
ATTORNEY.

Patented Oct. 30, 1934

1,979,141

UNITED STATES PATENT OFFICE 1,979,141

PIPE JOINT AND PIPE JOINT GASKET

Stuart B. Clark, Riverton, and Frederick C. Langenberg, Edgewater Park, N. J., assignors to United States Pipe and Foundry Company, Burlington, N. J., a corporation of New Jersey Application July 1, 1932, Serial No. 620,320

5 Claims. (Cl. 285—135)

Our invention relates to pipe joints such as are formed between the bell end of one pipe and the spigot end of another pipe inserted in the bell. As heretofore constructed it has been customary to provide in the bell a tapered annular seat for a gasket located so as to embrace a portion of the spigot and adapted to afford a seat for a similarly tapered end of an elastic and compressible gasket and to provide an annular gland or follower adapted to give passage to the spigot and to enter the bell end of the pipe and having means as bolts by which it can be drawn against the butt end of the gasket so as to compress the gasket into its seat and into the portions of the bell surrounding the seat. As heretofore constructed, joints of this character have not proved to be entirely satisfactory and we have discovered that the failure or defective operation of such joints is due to two causes, the first of which is that the gasket being seated when first inserted upon the whole surface of the gasket seat, is liable not to have its portions contacting with the inner surface of the seat properly compressed, and the second reason being that in the compression of the gasket the partially compressed portions in contact with the seat and with the cylindrical portion of the bell lying adjacent to the seat, have an undesirable longitudinal motion along the contacting surfaces, which is liable to injure the surface and to bring about undesirable internal distortion of the compressible elastic substance of which the gasket is composed.

The object of our invention is to provide a pipe joint construction or make-up which will, as far as practical, be free from the objections which we have noted as applicable to such joints as heretofore constructed and our invention consists in using, in connection with the metallic elements of such joints as heretofore constructed, annular gaskets of compressible elastic material having tapered ends adapted to enter the tapered gasket seat formed in the bell but having a somewhat greater taper than that of the gasket seat so that when the gasket is inserted in the seat only the end of its tapered portion will actually contact with the seat, leaving a progressively increasing clearance between the seat and the wider portions of the tapered end of the gasket. For example, we have formed the seat in the bell with a taper of 28° and the tapered end of the gasket with an angle of 26° and have found this difference in the tapers of the seat and gasket to give excellent results. Another feature of our invention consists in incorporating in the outer or butt end of the gasket a strip of a strong fabric, such as canvas, extending over the end of the gasket and preferably for some distance downward over its inner and outer surfaces. The effect of this reinforcement of the butt end of the gasket is that when the compression has seated the tapered end of the gasket firmly in the tapered seat in the bell and the pressure of the gland upon the end of the gasket causes its cylindrical portion to expand into contact with the surrounding wall of the bell, that this expansion also takes place more or less progressively, since the reinforced portion of the gasket will not expand under pressure as freely as does the unreinforced portion and, thus, a tighter joint is formed between the cylindrical portion of the gasket and the cylindrical wall of the bell and cylindrical spigot than would be the case if the expansion of the cylindrical portion of the gasket was uniform throughout and, here again, the progressive compression of the gasket takes place without the same amount of friction between the gasket and the surface against which it is forced which is incidental to the use of gaskets as heretofore constructed in joints of the kind in question.

Another feature of value in the construction of the gasket with a reinforcing fabric of canvas or the like extending over its butt end is that this reinforcement greatly diminishes the liability of the compressible material of the gasket to extrude between the gland and the walls of the bell and spigot, thus, again preventing undesirable and detrimental distortion of the material making up the gasket.

It will be obvious from what we have said that while, generally speaking, our pipe joint is similar to joints as heretofore constructed, our use in making up such joints of gaskets having the novel features of construction which we have pointed out, brings about a new combination or coactive relationship between the parts, which results in the formation of a better joint and eliminates the liability, heretofore existing, to injurious distortion of the substances making up the gasket.

It is advisable that the canvas or like material which we incorporate in the butt end of the gasket, should be impregnated with a substance, such as pitch compound, which is inert to chemicals, the presence of which is to be anticipated in the ground in which the pipes are buried.

The nature of our invention will be best understood as described in connection with the drawing in which Figure 1 is a side elevation of our joint, and Figure 2, a longitudinal section on a larger scale through one side of the joint on the line 2—2 of Fig. 1.

A indicates the bell end of a pipe having formed within its bell an annular, tapered gasket seat, as shown at A¹. As shown, a circular opening A² is formed through the base or narrow portion of the gasket seat leading into a chamber A³ formed in the base of the bell, having walls which flare from the circular opening so that the base of this chamber A³ is broader than the opening. B is the spigot end of a pipe which is inserted in the bell A and, as shown, extends through the gasket seat and through the opening A² into the chamber A³ abutting against the bottom portion of said chamber. As shown, the outer end of the bell A has an outwardly extending flange A⁴.

C is a ring abutted against the under-side of the flange A⁴ and provided with bolt holes, as indicated at C¹. D is an annular gland or follower which surrounds the spigot pipe B and is of such thickness as to adapt it to enter the mouth of the bell A. This gland is provided with a flange D¹ pierced with bolt holes D² through which bolt holes and the bolt holes in the ring C pass bolts E by means of which and nuts E¹ the gland can be drawn forward into the bell A. The end D³ of the gland is tapered inwardly so as to form, as shown, a conical seat for the head of the gasket.

In all of the above mentioned parts the elements of the pipe joint are of a well known and commonly used construction.

F is an angular gasket of compressible and elastic material, such as vulcanized rubber. This gasket is formed with a tapered end, indicated at F¹, which is slightly more tapered than is the taper of the gasket seat A¹ so that when the gasket is inserted in the bell and pressed down into the gasket seat, the tapered end of the gasket will, before compression force is applied, contact with the inner or narrow portion of the gasket seat, leaving a progressively widening clearance between the outer portions of the tapered seat and tapered gasket. The outer or butt end of the gasket is preferably made, as shown, of cylindrical form, as indicated at F² and of such diameter as to leave a clearance between the cylindrical portion of the gasket and the cylindrical wall of the bell A. The outer end of the gasket is preferably given a conical form, as shown at F³, so as to contact with the conical end D³ of the gland. G is a strip of strong fabric such as canvas or the like, which is incorporated in the end of the gasket extending over its butt end and over the inner and outer side walls of the annular gasket, as indicated at G¹, G¹. It is usual in the make-up of a pipe joint of the kind to which our invention relates, to form the top end of the gasket either of metal, such as lead, or of some less compressible material and we have shown in the drawing a fold of canvas incorporated in the elastic and compressible material of the gasket, as indicated at H, so as to stiffen this top portion of the gasket.

The above described parts are shown in assembled relation to each other as they exist prior to the application of compression to the gasket by the drawing in of the gland D.

In operation the parts are assembled, as shown in Fig. 2 of the drawing, and then, by screwing up the nuts E¹ on the bolts E, the gland is drawn forward against the butt end of the gasket and into the bell end A. The first result of the compression upon the gasket is to compact the tapered end of the gasket already in contact with the tapered seat A¹, against the side of the pipe B, passing through it, and then to progressively expand the tapered end of the gasket into contact with the progressively broadening portions of the tapered seat. After the tapered end of the gasket has been brought into firm contact with the tapered seat, further pressure applied to the butt end of the gasket will expand its cylindrical portion into firm contact with the spigot end B and with the cylindrical wall of the bell and to insure that this contact shall also be, to a certain extent, progressive, we rely upon the incorporation in the head or butt end of the gasket of the layer of canvas or the like, indicated at G, G¹, which resists the tendency of the pressure applied through the gland, to expand the cylindrical portion of the gasket uniformly, causing the contact between the cylindrical portion of the gland and the bell to be progressive. The fabric backing also plays an important part in obviating the tendency of the material of the gasket to extrude into such spaces as are left between the gland and the wall of the bell and between the gland and the spigot end B. The conical form given to the butt end of the gasket and to the contacting end of the gland has a tendency to press the outer end of the gasket inward against the spigot B, thus insuring a very tight fit between this portion of the gasket and the spigot.

It will be obvious that our construction, by insuring the progressive seating of the tapered end of the gasket in the tapered gasket seat in the bell and the progressive seating of the cylindrical portion of the gasket against the cylindrical wall of the bell, provides for the maximum compression of the gasket against the spigot end of the inserted pipe and against the seat and cylindrical portion of the bell with the least possible friction between the gasket and the parts of the structure with which it is in contact and with, consequently, the least possible distortion of the material of which the gasket is formed, other than that lateral expansion which is necessary to bring about the desired firm contact between the gasket and those walls of the structure between which it is contained.

Having now described our invention, what we claim as new and desire to secure by Letters Patent, is:

1. In a pipe joint made up of the bell end of a pipe having formed within this bell an annular, tapered seat for a gasket, the spigot end of a pipe entering said bell and said gasket seat, an annular gasket of compressible and elastic material having a tapered end located in said gasket seat, an annular gland or follower contacting with the butt end of the gasket and means for actuating the gland to compress the gasket, the improvement which consists in providing in the make-up of such a pipe joint a compressible and elastic gasket having when uncompressed a tapered end of greater taper than that of the tapered gasket seat and which gasket is in the formation of the pipe joint progressively expanded and compressed upon its tapered seat and between said tapered seat and the spigot end of a pipe.

2. In a pipe joint made up of the bell end of a pipe having formed within this bell an annular, tapered seat for a gasket, the spigot end of a pipe entering said bell and said gasket seat, an annular gasket of compressible and elastic material having a tapered end located in said gasket seat, an annular gland or follower contacting with the butt end of the gasket and means for actuating the gland to compress the gasket, the improvement which consists in providing in the make-up of such a pipe joint a compressible and elastic gasket having, when uncompressed, a tapered end of greater taper than that of the tapered gasket seat and having firmly secured to its butt end an annular backing of canvas or the like extending over the entire butt end of the gasket between the inner and outer walls thereof and which gasket is in the formation of the pipe joint progressively expanded and compressed upon its tapered seat and between its outer and inner containing walls.

3. As a new article of manufacture an annular gasket of compressible elastic material adapted for use in the formation of joints between the bell end of a pipe and an inserted spigot end of another pipe, said gasket having a tapered end adapted for insertion in a tapered gasket seat and having its opposite or butt end reinforced by an incorporated layer of canvas or the like extending over the entire butt end of the gasket between the inner and outer walls thereof.

4. As a new article of manufacture, an annular gasket of compressible, elastic material, adapted for use in the formation of joints between the bell end of a pipe and an inserted spigot end of another pipe, said gasket having a tapered end, adapted for insertion in a tapered gasket seat formed in the bell but having, when uncompressed, a greater degree of taper than that of the seat, having its outer or butt end reinforced by an incorporated layer of canvas or the like extending over the entire butt end of the gasket between the inner and outer walls thereof.

5. A gasket as called for in claim 3, having its outer or butt end reinforced by an incorporated layer of canvas or the like extending over the entire butt end of the gasket between the inner and outer walls thereof and extending over the adjacent portions of the inner and outer walls.

STUART B. CLARK.
FREDERICK C. LANGENBERG.